Patented Jan. 2, 1951

2,536,096

UNITED STATES PATENT OFFICE 2,536,096

PROCESS FOR MANUFACTURE OF COPPER COMPOUNDS

Percy John Rowe, Martinez, Calif., assignor to The Mountain Copper Company, Ltd., a corporation of Great Britain No Drawing. Application September 2, 1947, Serial No. 771,697

5 Claims. (Cl. 23—147)

This invention relates to the manufacture of copper hydroxide and copper oxide from metallic copper.

I have discovered that, by passing an aqueous solution of ammonia over copper in the presence of air, a solution of a complex copper ammonium compound is formed; in the presence of air, the copper is present as cupric copper. If the application of this ammoniacal solution is continued, in the presence of oxygen, there forms upon the surface of the metallic copper a film which, depending upon the temperature, is either copper oxide or copper hydroxide. If this film is removed, a fresh metallic copper surface is exposed which is readily acted upon by the solution.

It should be obvious that this process can be readily operated continuously and that it is only necessary to add a suitable source of oxygen as air and a small amount of water to practice the process in a continuous manner. The copper hydroxide or copper oxide is recovered, dried, and comminuted to a desired fineness if not initially satisfactory. The copper hydroxide recovered is of a bright blue color and, if the agitation is sufficiently violent, the product is initially of a small particle size making it useful as an insecticide and fungicide, and for manufacture of copper naphthenate and other copper salts.

The strength of the ammoniacal solution can vary over relatively wide limits and one can use solutions containing as little as 1% of ammonium hydroxide up to a solution having such concentration that it can be characterized as aqua-ammonia. Generally the solution should contain at least 3% of $NH_3$ to secure a good yield.

At temperatures above about 87° F. the process can form mixtures of cupric hydroxide and cupric oxide, as is evidenced by the color of the precipitate changing from blue to greenish blue; as the temperature is increased and agitation continued, the product becomes increasingly dark to dark brown and is presently presumed to be a mixture of copper oxide and copper oxide monohydrate, $CuO \cdot H_2O-CuO$. Blue cupric hydroxide can be recovered from solutions whose temperature is considerably above 87° F. when the precipitate is removed from the solution substantially as it is formed. When the precipitate is allowed to remain in contact with the solution over prolonged periods, say 4 to 5 hours, the temperature of the solution should not exceed 87° F. For usual commercial operations I prefer to employ a temperature in the range of ordinary atmospheric temperatures, e. g. 55° to 85° F. Above about 140° F. copper oxide is formed as the product.

The desirable blue color of the precipitate can be retained, even though the temperature of the solution is as high as 100° F. and slightly higher, if the precipitate is removed immediately upon formation and placed in water or washed with water and dried. It is desirable to remove the precipitate as soon as possible after formation, preferably within an hour or two, to ensure the desired blue color.

One can use air or any readily available source of oxygen. Only enough oxygen is required to ensure the formation of the cupric ion in the solution.

Any suitable copper can be utilized so long as it provides adequate surface for contact with the solution.

The agitation should be such as to break loose the particles of the copper hydroxide or oxide; if the agitation is relatively gentle, the particles are relatively large and thick. They are more insensitive to temperature and to the solution so they can remain longer and are less affected by temperature, enabling temperatures above 85° F. to be employed.

In one operation carried on in accordance with the present invention, a cylindrical tumbling drum was filled with 80 pounds of two-inch lengths of No. 12 wire to provide a mass of copper having a relatively large surface. Nine gallons of an aqueous solution of ammonia (3% $NH_3$) were then pumped in and discharged as a shower over the copper mass in the drum at a temperature between 70° and 80° F. The drum was provided with loosely fitting end covers to permit air to pass over the wet copper and to reduce ammonia loss. The drum was rotated and the copper mass was thus continuously agitated with such violence that the film of copper hydroxide which formed on the surface of the copper was broken loose and displaced, the particles being swept out in the stream of ammonia solution from which it was separated, the ammonia solution being returned to the closed vessel. The ammonia solution is saturated with cupric copper. After five hours, 6½ pounds of copper hydroxide had been recovered.

When copper oxide is desired as the product, generally a temperature of 140° F. must be employed to ensure complete absence of the hydroxide. Since utilization of temperatures of this order introduce an ammonia vaporization problem, it may be preferable to form the hydroxide first and then heat this to form the oxide.

I claim:

1. A continuous process for the manufacture of copper compounds of the group consisting of copper hydroxide, cupric oxide and mixtures thereof, comprising bringing a material consisting essentially of an aqueous solution of ammonia saturated with cupric copper into contact with copper bodies in the presence of available oxygen, thereby forming insoluble films of the copper compound on the copper, while agitating said copper bodies so as to separate at least portions of the films from the bodies and to expose fresh metallic copper surfaces to the action of the material, and recovering the separated copper compound.

2. The process of claim 1 wherein the effective temperature of operation is below about 85° F. and the compound is copper hydroxide.

3. The process of claim 1 wherein the effective temperature of operation is above about 140° F. and the compound is cupric oxide.

4. A continuous process for the manufacture of copper hydroxide, comprising passing a material consisting essentially of an aqueous solution of ammonia saturated with cupric copper at a temperature below about 85° F. over copper bodies in the presence of available oxygen, thereby forming insoluble films of copper hydroxide on the copper, while agitating said copper bodies with sufficient violence to separate at least portions of the films from the bodies and to expose fresh metallic copper surfaces to the action of the material, and recovering the separated copper hydroxide.

5. A continuous process for the manufacture of cupric oxide, comprising passing a material consisting essentially of an aqueous solution of ammonia saturated with cupric copper at a temperature above about 140° F. over copper bodies in the presence of available oxygen, thereby forming insoluble films of cupric oxide on the copper, while agitating said copper bodies with sufficient violence to separate at least portions of the films from the bodies and to expose fresh metallic copper surfaces to the action of the material, and recovering the separated cupric oxide.

PERCY JOHN ROWE.

REFERENCES CITED

The following references are of record in the file of this patent:

UNITED STATES PATENTS

| Number | Name | Date |
|---|---|---|
| 682,232 | Beck | Sept. 10, 1901 |
| 1,487,145 | Caron | Mar. 18, 1924 |
| 2,290,313 | Caron | July 21, 1942 |

OTHER REFERENCES

"Gas Analysis" by L. M. Dennis, 1929 ed., page 185, top. MacMillan Co., N. Y., publishers.